US008202076B2

(12) United States Patent
Parrinello et al.

(10) Patent No.: US 8,202,076 B2
(45) Date of Patent: Jun. 19, 2012

(54) APPARATUS FOR COMPRESSION MOULDING OBJECTS

(75) Inventors: Fiorenzo Parrinello, Medicina (IT); Zeno Zuffa, Borgo Tossignano (IT)

(73) Assignee: Sacmi Cooperativa Meccanici Imola Societa' Cooperativa, Imola (IT)

( * ) Notice: Subject to any disclaimer, the term of this patent is extended or adjusted under 35 U.S.C. 154(b) by 67 days.

(21) Appl. No.: 12/304,686

(22) PCT Filed: Jun. 8, 2007

(86) PCT No.: PCT/EP2007/055664
§ 371 (c)(1),
(2), (4) Date: Dec. 12, 2008

(87) PCT Pub. No.: WO2007/144312
PCT Pub. Date: Dec. 21, 2007

(65) Prior Publication Data
US 2009/0175976 A1 Jul. 9, 2009

(30) Foreign Application Priority Data
Jun. 14, 2006 (IT) .............................. MO2006A0185

(51) Int. Cl.
*B29C 43/02* (2006.01)
(52) U.S. Cl. .................... 425/348 S; 425/398; 425/534; 425/537; 264/318
(58) Field of Classification Search .......... 425/525–529, 425/534, 537, 348 S, 422, 398; 264/531–532, 264/523, 318, 320
See application file for complete search history.

(56) References Cited

U.S. PATENT DOCUMENTS

| 4,370,121 | A | * | 1/1983 | Valyi | 425/526 |
|---|---|---|---|---|---|
| 4,832,592 | A | * | 5/1989 | Saumsiegle | 425/525 |
| 5,736,173 | A | | 4/1998 | Wright et al. | |
| 6,079,972 | A | | 6/2000 | Gellert | |
| 6,989,124 | B2 | | 1/2006 | Miller et al. | |
| 7,128,865 | B2 | * | 10/2006 | Martin | 425/556 |
| 7,156,643 | B2 | * | 1/2007 | Parrinello | 425/345 |
| 7,399,174 | B2 | * | 7/2008 | Deardurff et al. | 425/348 R |
| 7,645,132 | B2 | | 1/2010 | McCready | |
| 2001/0016239 | A1 | | 8/2001 | Koch et al. | |
| 2002/0028265 | A1 | | 3/2002 | Oueslati et al. | |
| 2004/0166193 | A1 | | 8/2004 | Parrinello et al. | |
| 2005/0136150 | A1 | | 6/2005 | Martin | |
| 2005/0158421 | A1 | | 7/2005 | Zoppas | |
| 2005/0225008 | A1 | | 10/2005 | Deardurff et al. | |

* cited by examiner

*Primary Examiner* — Richard Crispino
*Assistant Examiner* — Thukhanh Nguyen
(74) *Attorney, Agent, or Firm* — Pearne & Gordon LLP

(57) ABSTRACT

An apparatus comprises a punch arrangement and a die arrangement that are opposite one another and closable for defining a forming chamber in which an object can be compression-molded from a dose of plastics, a punch included in the punch arrangement and two parts that are mutually movable for forming a portion of the object provided with undercuts. The punch arrangement comprises an annular forming element for forming an edge zone of the object, the annular forming element and the punch being mutually movable while the dose fills the forming chamber.

29 Claims, 17 Drawing Sheets

APPARATUS FOR COMPRESSION MOULDING OBJECTS

The invention relates to an apparatus for forming objects, particularly for forming preforms through compression moulding. The preforms obtained using the apparatus according to the invention can be subsequently transformed into containers, for example bottles, through a stretch-blow-moulding process.

The preforms for obtaining containers comprise a substantially cylindrical hollow body extending along a longitudinal axis, having an end closed by a generally dome-shaped transverse wall. The hollow body further has an open end on which a mouth is obtained that comprises fixing means, for example a threaded zone, suitable for engaging a container closure. The open end of the preform is bounded by an edge zone that extends circumferally around the longitudinal axis.

Apparatuses are known for forming preforms through compression moulding of doses of plastics. Such apparatuses comprise a plurality of moulds, which are mounted in a peripheral region of a rotatable carousel. Each mould comprises a punch for internally shaping the preform and a die provided with a cavity in which a portion of the external surface of the preform can be formed. The mould is further provided with at least two movable parts that enable the mouth to be shaped externally. The movable parts can be distanced from one another to extract the preform from the mould even if the mouth has undercuts, such as, for example, threaded zones.

During operation, the mould is initially in an open position in which the die is distanced from the punch so that it is possible to introduce a dose of plastics inside the cavity. In this position, the two movable parts can be associated alternatively with the die or the punch.

Subsequently, the mould reaches a closed position in which between the die, the punch and the movable parts there is defined a forming chamber having a geometry corresponding to that of the desired preform. Whilst the mould moves from the open position to the closed position, the plastics are distributed inside the forming chamber, in which the plastics remain for a sufficient time to ensure stabilisation and an initial and partial cooling of the preform. At the end of this step, the mould opens again so that the preform can be removed.

A drawback of known apparatuses is that, during some transitional steps that occur whilst the mould goes from the open position to the closed position, undesired leaks of plastics are possible between the movable parts and the punch, which interact to form the edge zone that bounds the open end of the preform. In fact, the doses of plastics that are used for moulding preforms usually have a relatively great mass such as to occupy a significant volume of the cavity of the die. When the mould starts to close and the punch starts to interact with the dose, the latter is pushed upwards and can exit the gap defined between the movable parts and the punch, which are still in a mutual moving step.

If macroscopic leaks of plastics occur into the gap defined between the movable parts and the punch, visible flashes may form on the finished preform. Small quantities of plastics may also flow into zones communicating with the forming chamber whilst the latter is filled and they may subsequently return to the forming chamber. These small quantities cool very rapidly and, when returning to the forming chamber, have a temperature that is noticeably lower than that of the surrounding plastics, with which these small quantities mix with difficulty. In the finished preform, defective regions thus form in which microcracks are present that are not easily identifiable, which may generate defects on the bottle obtained from the preform.

US 2004/0166193 discloses a method and a plant for forming articles of synthetic material by compression moulding. The method and the plant are particularly suitable for forming large-thickness articles or articles comprising at least two different materials which may have different technical characteristics.

US 2005/0158421 discloses a compression-moulding press for moulding plastic containers, consisting of a moulding cavity formed by a plunger, a female mould and two separable lips. A cylinder slides inside a sliding slide to keep the lips closed. The plunger slides inside the cylinder with respect to both the cylinder and the slide, when moulding the containers.

An object of the invention is to improve the apparatuses for forming objects, particularly for obtaining preforms through compression moulding.

A further object is to provide apparatuses for forming objects by compression moulding of a dose of plastics, in which the risks are reduced of an undesired leak of the plastics from the mould before the latter reaches the closed position.

According to the invention, there is provided an apparatus comprising a punch arrangement and a die arrangement, said punch arrangement and said die arrangement being opposite one another and closable for defining a forming chamber in which an object can be compression-moulded from a dose of plastics, a punch included in said punch arrangement and two mutually movable parts for forming a portion of said object provided with undercuts, wherein said punch arrangement comprises an annular forming element for forming an edge zone of said object, said annular forming element and said punch being mutually movable whilst said dose fills said forming chamber.

Owing to the annular forming element, the forming chamber can be closed in an early step, in which between the punch arrangement, the die arrangement and the movable parts, which can be associated with the punch arrangement or with the die arrangement, a forming chamber is defined that has a volume significantly greater than the volume of the dose. Subsequently, whilst the punch and the annular forming element move in relation to one another, it is possible to gradually reduce the volume of the forming chamber until the desired object is completely shaped.

This enables the risk to be reduced of leaks of plastics whilst the latter is filling the forming chamber. Flashes are thus prevented from forming that would be highly visible on the formed object. Further, as the forming chamber is closed at a moment in which it is much greater than the dose, the plastics are prevented from flowing into small zones from which the plastics could subsequently return to the forming chamber, which enables the microscopic defects, such as cracks, to be reduced on the finished object.

In an embodiment, the annular forming element is interposed between the punch and the movable parts.

This further enables to improve the evacuation of the gases that are generated when the dose is moulded, inasmuch as these gases can exit the forming chamber both through a first interface zone defined between the annular forming element and the punch and through a second interface zone defined between the annular forming element and the movable parts.

The annular forming element facilitates the operations for removing the finished object from the apparatus according to the invention, particularly if this object, after moulding, remains associated with the punch. In fact, as the annular forming element can move with respect to the punch, this element can be of assistance when the finished object has to be detached from the punch.

The invention can be better understood and implemented with reference to the attached drawings that illustrate some exemplifying and non-limiting embodiments thereof, in which.

Figure 1:
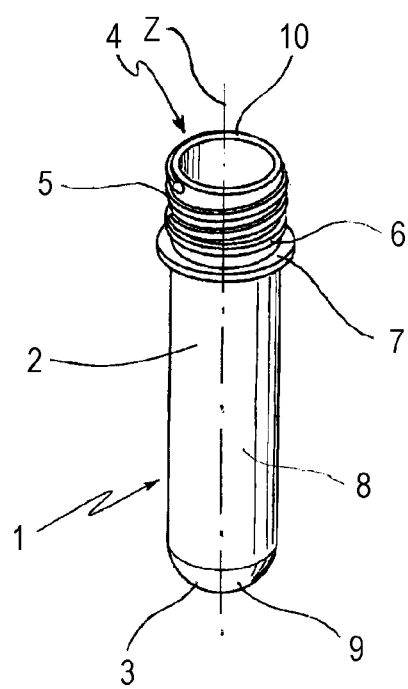
FIG. 1 is a schematic perspective view of a preform for obtaining a bottle.

FIG. 1 shows a preform 1 that is usable for obtaining a container, particularly a bottle, through a stretch-blow-moulding process. The preform 1 is made of plastics, for example polyethyleneterephthalate (PET), polypropylene (PP), polyvinyl chloride (PVC), polyethylene naphthalate (PEN), high-density polyethylene (HDPE). The preform 1 comprises a hollow body 2 extending along a longitudinal axis Z and bounded by an external surface 8. The hollow body 2 has a first end closed by a transverse wall 3, which is dome-shaped, bounded externally by a base surface 9. At a second end of the preform 1, opposite the first end, a mouth 4 is obtained, also called a "finish", which does not undergo substantial variations in shape during the stretch-blow-moulding process. The mouth 4 comprises a threaded portion 5, which is suitable for engaging a corresponding further threaded portion of a cap, and a circular ridge 6 and a ring 7 arranged below the threaded portion 5. The mouth 4 is bounded above by an annular edge zone 10, which is substantially annulus-shaped.

Figure 2:
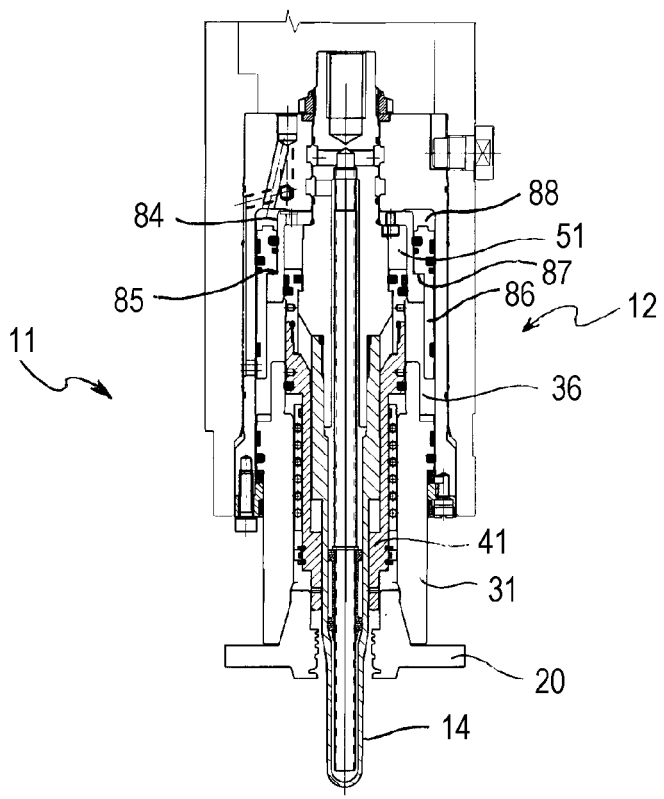
FIG. 2 is a partially sectioned longitudinal view of a moulding unit for compression moulding a dose of plastics for obtaining the preform in FIG. 1, in an open position.
Figure 2:
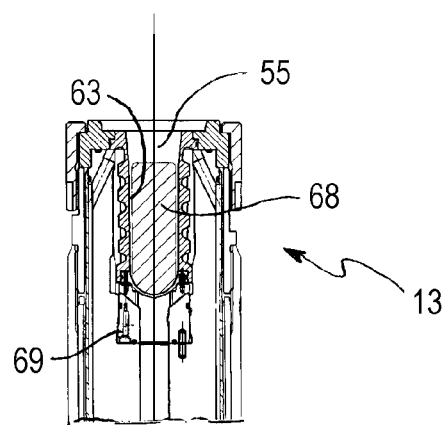

FIG. 2 shows a moulding unit 11 that is comprised in an apparatus for obtaining preforms of the type shown in FIG. 1 through compression moulding.

The apparatus may comprise a plurality of moulding units 11 mounted in a peripheral region of a carousel rotating around a rotation axis that may, for example, be vertical. The moulding unit 11 comprises a punch arrangement 12 facing a die arrangement 13, the punch arrangement 12 and the die arrangement 13 being able to interact mutually to form the preform 1. In the shown example, the punch arrangement 12 is arranged above the die arrangement 13, but it is possible to hypothesise a case in which the punch arrangement 12 is arranged below the die arrangement 13 or the punch arrangement 12 and the die arrangement 13 are positioned at the same level. In all cases, the punch arrangement 12 faces the die arrangement 13.

Figure 3:
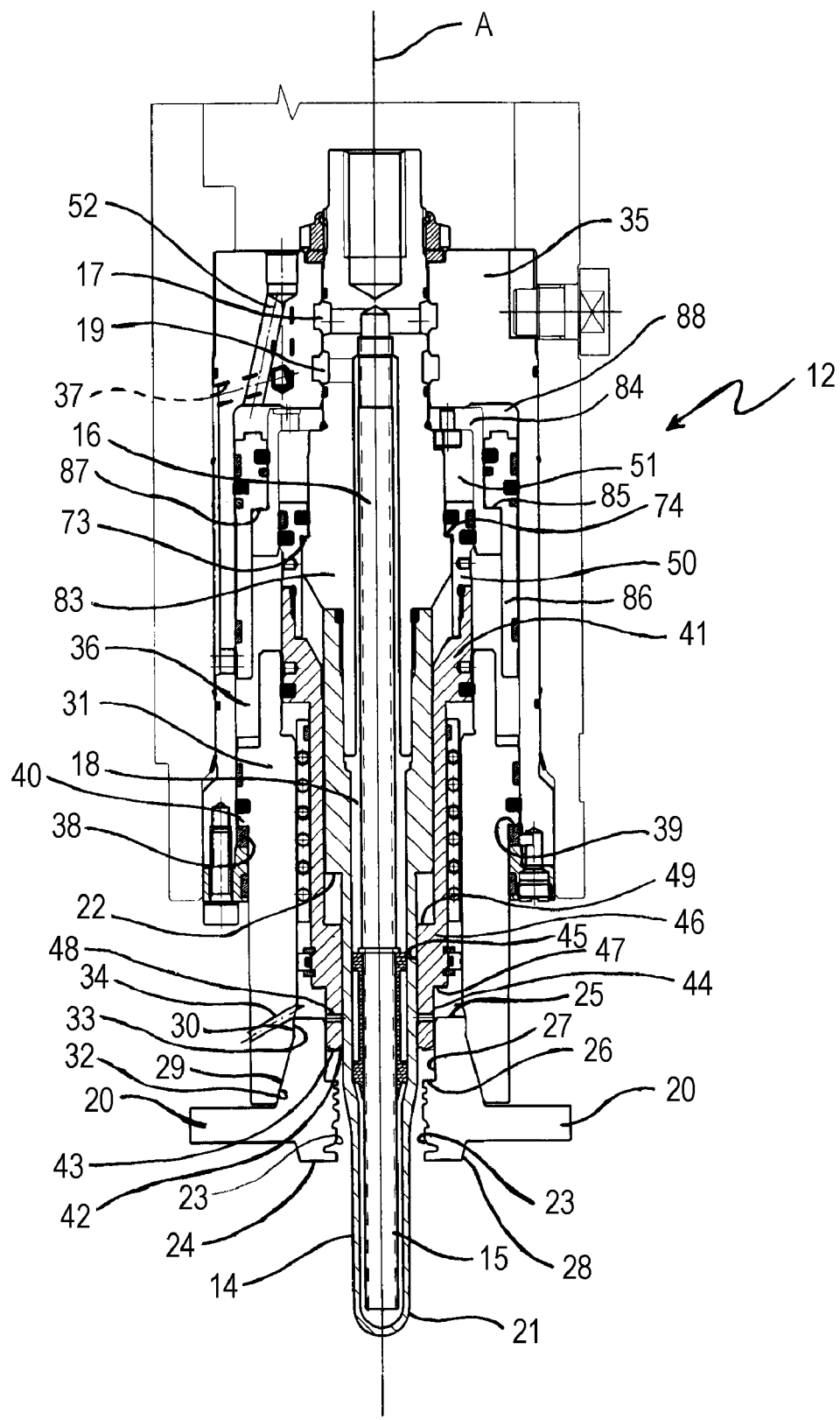
FIG. 3 is a partially sectioned enlarged longitudinal view, showing a punch arrangement of the moulding unit in FIG. 2.

As shown in FIG. 3, the punch arrangement 12 comprises a punch 14 extending along a moulding axis A and provided with an external forming surface 21 intended for internally shaping the preform 1. The punch 14 is provided with a shoulder 22, which is positioned above the external forming surface 21.

Inside the punch 14 a pipe 15 is housed, inside which pipe 15 an inlet conduit 16 is defined that is arranged along the moulding axis A and can be traversed by a cooling fluid. The inlet conduit 16 communicates with a source of cooling fluid that is not shown through an inlet zone 17. Between the pipe 15 and the punch 14 an outlet conduit 18 is defined having an annular shape, which outlet conduit 18 enables the cooling fluid to exit the moulding unit 11 through an outlet zone 19.

In the shown example, the punch 14 is mounted in a fixed position on the moulding unit 11.

The punch arrangement 12 further comprises a pair of movable parts 20 suitable for shaping the mouth 4 of the preform 1. The movable parts 20 can be moved by a driving device, which is not shown, between a contact position, shown in FIG. 3, and a detached position shown in FIG. 14. In the contact position, the movable parts 20 are in mutual contact and define a complex forming surface 23 that enables the threaded portion 5, the circular ridge 6 and the ring 7 to be shaped. These zones of the preform 1 define undercut parts that can be removed from the moulding unit 11 by moving the movable parts 20 away from one another, as occurs in the detached position.

In an embodiment that is not shown, the moulding unit 11 may comprise more than two movable parts 20.

Each movable part 20 is bounded transversely to the moulding axis A by a lower surface 24 and by an upper surface 25. Inside each movable part 20 a step is obtained, arranged above the complex forming surface 23, which step is bounded by a transverse surface 26 that extends transversely to the moulding axis A and by a guiding surface 27 that is arranged substantially along the moulding axis A. On each movable part 20 it is possible to define a substantially conical first coupling surface 28 that laterally bounds the movable part 20 near the lower surface 24. A second coupling surface 29, which is also substantially conical, is arranged outside each movable part 20 at a higher level than the first coupling surface 28. The second coupling surface 29 is joined to the upper surface 25 by a cylindrical portion 30. The cylindrical portion 30 can extend around the entire movable part 20, i.e.

have an angular extent of 180°, or can be replaced by cylindrical segments between which flat surfaces are interposed. The latter are obtained by removing material between one cylindrical segment and another, which makes it possible to start to move the movable parts away from one another before this would occur if the movable parts 20 were bounded by a 180° cylindrical portion 30. The moulding unit 11 comprises a retaining sleeve 31 that interacts with the movable parts 20 for maintaining the movable parts 20 in mutual contact in the contact position. The retaining sleeve 31 extends around the moulding axis A. In a lower portion of the retaining sleeve 31 and inside the latter a substantially conical retaining surface 32 is provided that, in the contact position, interacts with the second coupling surface 29. An internal cylindrical portion 33, which is obtained inside the retaining sleeve 31 above the retaining surface 32, is suitable for interacting with the cylindrical portion 30 of each movable part 20.

In the retaining sleeve 31 at least one hole 34 is obtained through which a pressurised fluid can be supplied, as will be explained in detail below.

The retaining sleeve 31 is movable parallel to the moulding axis A inside a housing element 35 of the moulding unit 11. A pressurised fluid, for example compressed air, is contained in a lower chamber 36 obtained above the retaining sleeve 31 and enters the lower chamber 36 through a supply conduit 37. The pressurised fluid acts on the retaining sleeve 31 by pushing the retaining sleeve 31 outside the housing element 35, namely to the movable parts 20. In other words, the pressurised fluid exerts on the retaining sleeve 31 a force parallel to the moulding axis A and directed to the die arrangement 13.

On a lower portion of the housing element 35 a stop 38 is mounted, which stop 38 can engage a front surface 39 bounding a ridge 40 that is obtained on the retaining sleeve 31. In this way the stop 38 prevents the retaining sleeve 31 from coming out from the housing element 35 beyond a preset limit. An annular forming element is interposed between the retaining sleeve 31 and the punch 14, said annular forming element comprising a movable element 41 having a tubular shape and surrounding the punch 14 along the moulding axis A. The movable element 41 is substantially coaxial to the punch 14. A portion of the punch 14 bounded by the external forming surface 21 emerges from the movable element 41 and faces the die arrangement 13.

Figure 15:
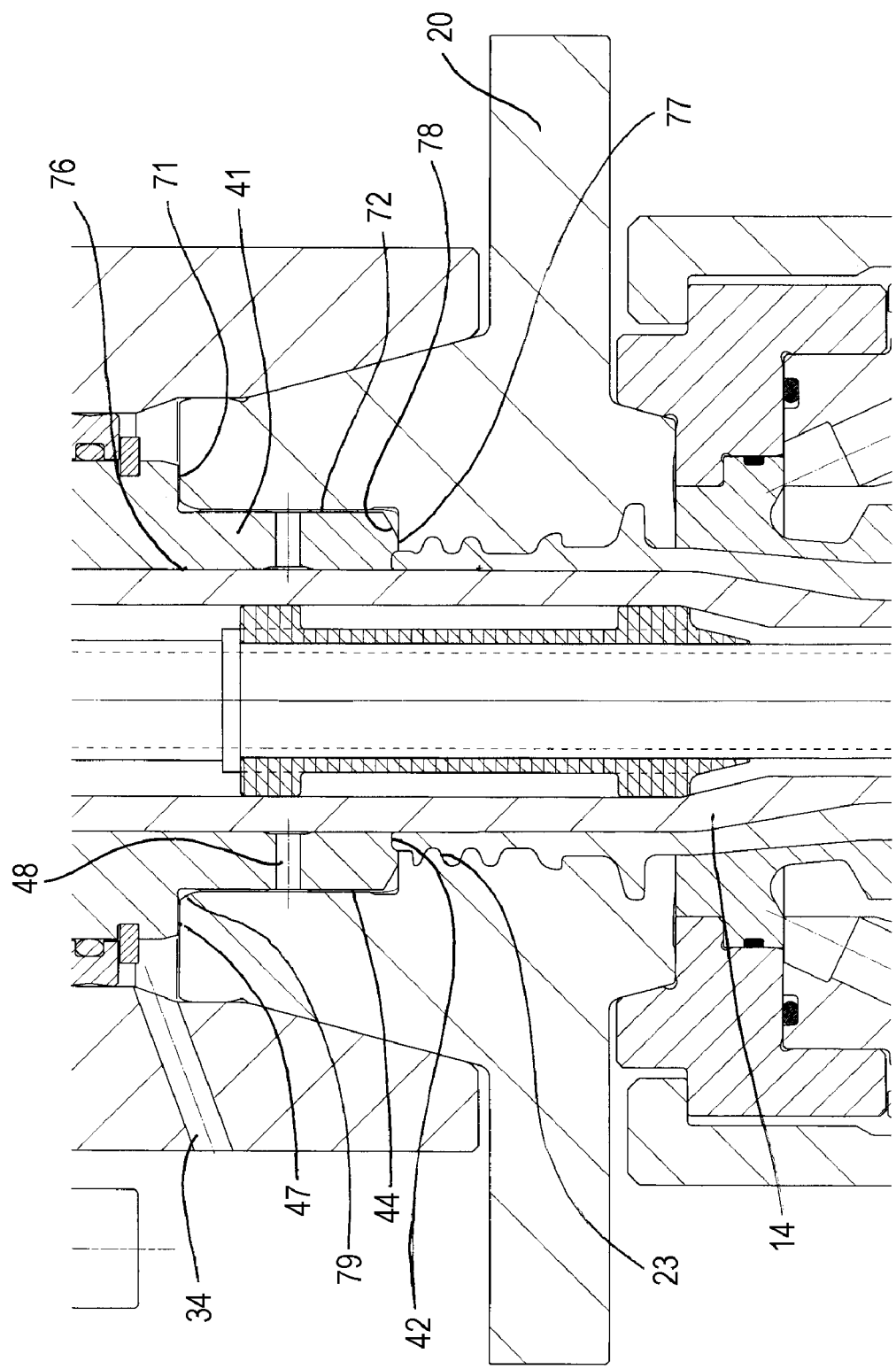
FIG. 15 is an enlarged longitudinal section of a detail of FIG. 9.

At a lower end of the movable element 41 an annular forming surface 42 is obtained, which is more visible in FIG. 15, said annular forming surface 42 being suitable for shaping the edge zone 10 of the preform 1. Near the annular forming surface 42, the movable element 41 is bounded by a further transverse surface 43, facing the transverse surface 26 of each movable part 20.

Parallel to the moulding axis A and near the lower end of the movable element 41, the movable element 41 is bounded externally by an external guiding surface 44, that can engage the guiding surface 27 of each movable part 20. The movable element 41 is on the other hand internally bounded by an internal guiding surface 45 that can slide along the punch 14.

Above the external guiding surface 44, the movable element 41 comprises a zone with a larger diameter 46 that is bounded, transversely to the moulding axis A, by an interacting surface 47 that can interact with the upper surface 25 of each movable part 20.

Near the lower end of the movable element 41 a plurality of through holes 48 is obtained, the function of which will be better explained below, said through holes 48 being arranged transversely to the moulding axis A.

Inside the movable element 41, a further shoulder 49 is obtained that may abut against the shoulder 22 obtained on the punch 14.

A tubular element 50 is fixed to an upper end of the movable element 41, for example though a threaded connection. Inside the tubular element 50 a protrusion 73 is obtained that can engage a shoulder zone 74 projecting from a component 83 that is fixed with respect to the punch 14.

The tubular element 50 is movable along the moulding axis A, together with the movable element 41, inside a cup element 84 that is fixed to the housing element 35, for example by screws or by the component 83 that locks the cup element 84 against the housing element 85, as shown in FIG. 2. The cup element 84 is provided with a widened lower end, which is bounded, transversely to the moulding axis A, by an upper abutting surface 85. Between the cup element 84 and the housing element 35 a sleeve component 86 can slide that extends around the moulding axis A. The sleeve component 86 is internally provided with a lower abutting surface 87, arranged transversely to the moulding axis A, which lower abutting surface 87 can engage the upper abutting surface 85 of the cup element 84.

Between the component 83, the cup element 84 and the tubular element 50 an intermediate chamber 51 is defined in which a further pressurised fluid is contained, for example compressed air, said further pressurised fluid acting on the tubular element 50.

The further pressurised fluid can enter the intermediate chamber 51 through an inlet conduit 52 and is at higher pressure than that of the pressurised fluid contained in the lower chamber 36. The further pressurised fluid, through the tubular element 50, exerts on the movable element 41 a force that is directed parallel to the moulding axis A and that tends to push the movable element 41 to the die arrangement 13.

Between the cup element 84, the housing element 35 and the sleeve component 86 an upper chamber 88 is defined that communicates with the inlet conduit 52. In the shown embodiment, the upper chamber 88 communicates with the intermediate chamber 51 and both contain the further pressurised fluid that is supplied through the inlet conduit 52. In an embodiment that is not shown, it is possible to introduce into the intermediate chamber 51 and into the upper chamber 88 two distinct fluids having different pressures from one another. For example, to the upper chamber 88 a still further pressurised fluid could be sent having a pressure that is greater than the further pressurised fluid present in the intermediate chamber 51.

In any case, the fluid that is contained in the upper chamber 88 is such as to push the sleeve component 86 to the die arrangement 13.

Figure 4:
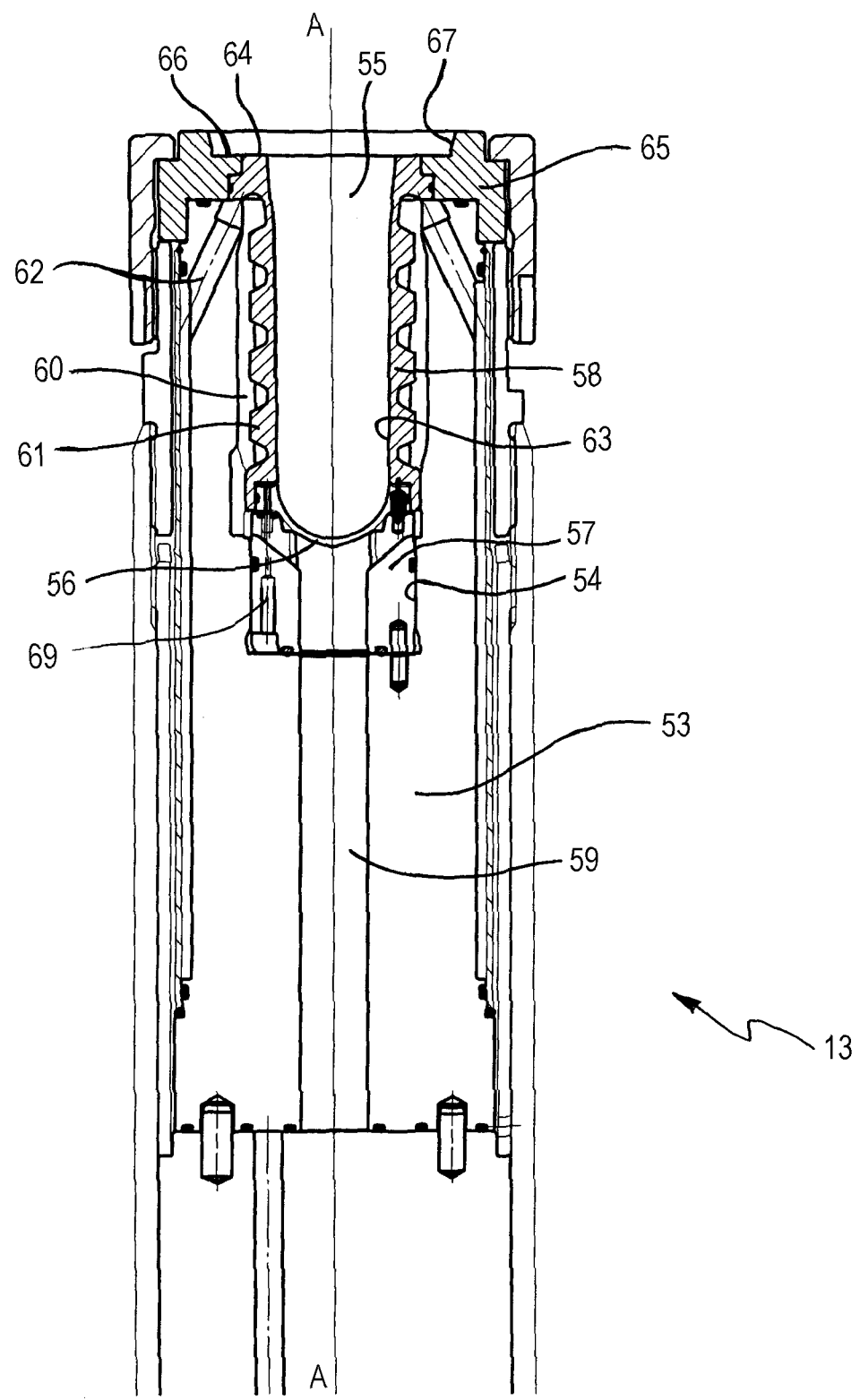
FIG. 4 is a partially sectioned enlarged longitudinal view showing a die arrangement of the moulding unit in FIG. 2.

As shown in FIG. 4, the die arrangement 13 comprises a stem 53 that is movable along the moulding axis A by means of an actuator that is not shown. At the upper end of the stem 53 a seat 54 is obtained in which a die cavity 55 is housed, which die cavity 55 is bounded by an internal forming surface 63 that is suitable for externally shaping the external surface 8 and the base surface 9 of the preform 1. The die cavity 55 is bounded below by a bottom wall 56 that is supported inside the seat 54 by a supporting element 57. The latter also supports a side wall 58, having a substantially tubular shape, which side wall 58 laterally bounds the die cavity 55. The side wall 58 is bounded, in an upper portion thereof, by a face 64 facing the lower surface 24 of each movable part 20. Both the bottom wall 56 and the side wall 58 are made of a material that has a thin thickness and is elastically deformable, for example steel.

Inside the stem 53 a cooling conduit 59 is obtained that extends along the moulding axis A and communicates with a source of cooling fluid that is not shown. The cooling conduit 59 leads into the seat 54 near the bottom wall 56 and communicates with a gap 60 arranged outside the side wall 58.

The latter is provided, on the external surface thereof, with a plurality of cooling fins 61. From the gap 60 a plurality of return conduits 62 lead away, through which the cooling fluid can leave the die arrangement 13.

To the upper end of the stem 53 an annular element 65 is fixed on which a further face 66 is definable that, in use, is adjacent to the face 64 and is arranged on the same plane as the latter.

Around the further face 66 a conical surface 67 is arranged that can interact with the first coupling surface 28 of each one of the movable parts 20.

At least one passage 69 leads into the die cavity 55, which passage 69 can be alternatively connected to a suction source or to a source of pressurised fluid.

During operation, the moulding unit 11 is initially in an open position shown in FIG. 2, in which the die arrangement 13 is distanced from the punch arrangement 12. In this position a dose 68 of plastics in molten/pasty state is deposited in the die cavity 55 by a transferring device that is not shown. The dose 68 has a cross section that is less than the cross section of the die cavity 55 and may have a lower end that is shaped so as to be able to be introduced more easily into the die cavity 55.

The movable parts 20 are maintained in the contact position by the retaining sleeve 31. The latter is initially pushed to the die arrangement 13 by the pressurised fluid contained in the lower chamber 36.

Also the movable element 41 and the sleeve component 86 are pushed to the die arrangement 13 by the further pressurised fluid contained respectively in the intermediate chamber 51 and in the upper chamber 88. In particular, in the open position shown in FIG. 2, the lower abutting surface 87 of the sleeve component 86 is in contact with the upper abutting surface 85 of the cup element 84, through the effect of the thrust exerted by the further pressurised fluid contained in the upper chamber 88.

Subsequently the actuator moves the stem 53, and the die cavity 55 therewith, to the punch arrangement 12. The upper end of the dose 68 thus comes into contact with the lower end of the punch 14, as shown in FIG. 5.

Figure 5:
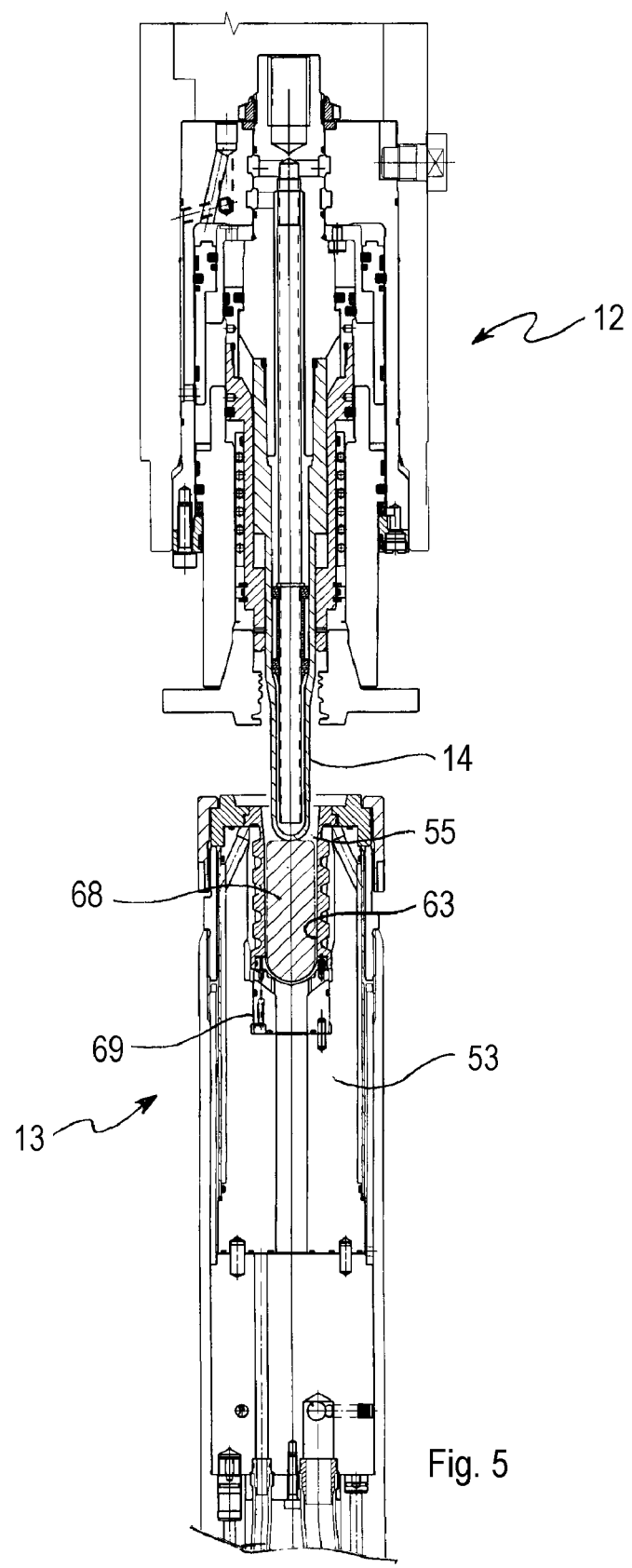
FIG. 5 is a view like the one in FIG. 2, showing the moulding unit in a first intermediate position, in which the dose comes into contact with a punch included in the punch arrangement.

In the positions shown in FIGS. 2 and 5, the passage 69 can be connected to the suction source in such a way as to eliminate the air that is entrapped between the dose 68 and the internal forming surface 63 of the die cavity 55.

Figure 6:
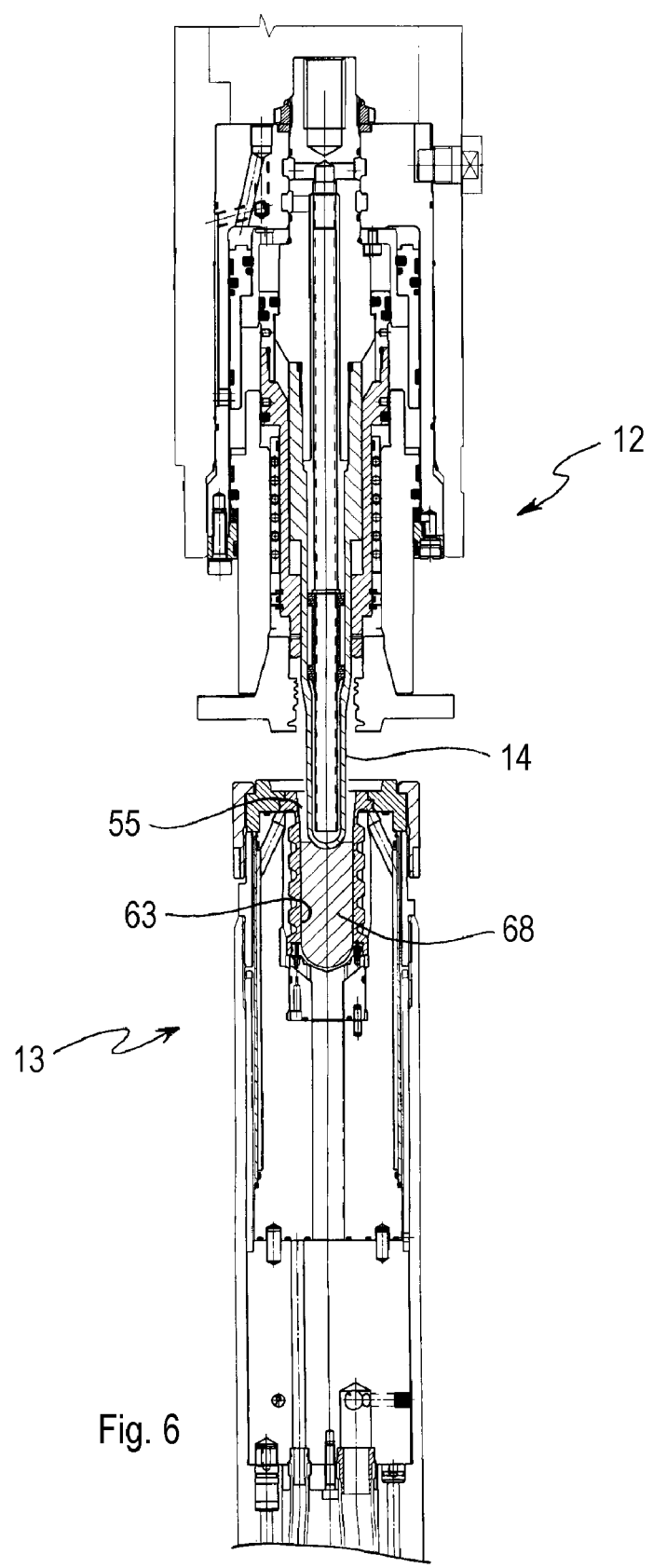
FIG. 6 is a view like the one in FIG. 2, showing the moulding unit in a second intermediate position, in which the punch starts to exert pressure on the dose.

Whilst the actuator continues to move the die cavity 55 to the punch arrangement 12, the punch 14 starts to crush the dose 68, deforming the dose 68 and redistributing the latter inside the die cavity 55. In particular, the plastics, pressed by the punch 14, widen and entirely occupy the part of the die cavity 55 arranged below the punch 14. The dose 68 thus starts to take the shape of the internal forming surface 63 of the die cavity 55, as shown in FIG. 6.

Figure 7:
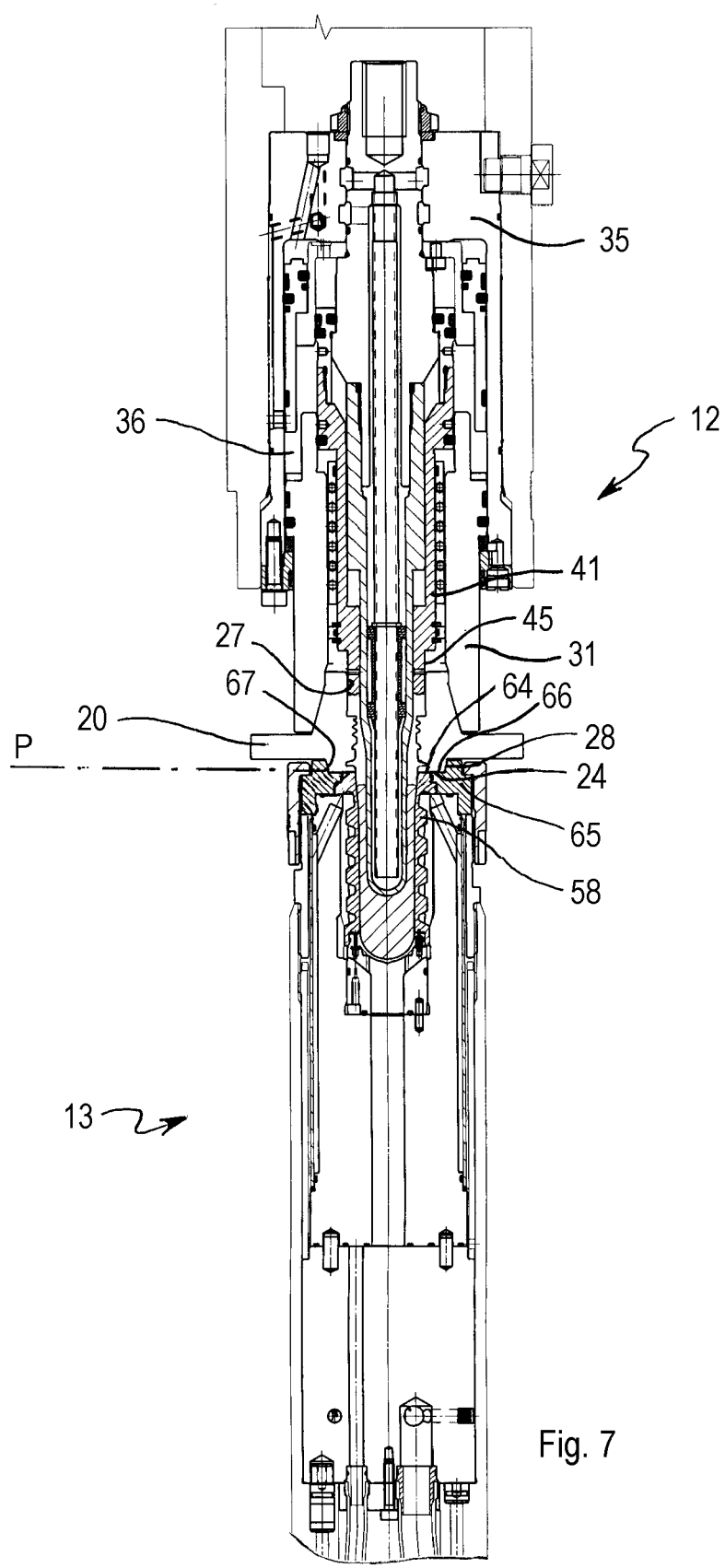
FIG. 7 is a view like the one in FIG. 2, showing the moulding unit in a third intermediate position, in which the punch is penetrating the dose.

Subsequently, the die arrangement 13 comes into contact with the punch arrangement 12, as shown in FIG. 7. The face 64 of the side wall 58 and the further face 66 of the annular element 65 interact with the lower surfaces 24 of the movable parts 20 along an interaction plane P. In particular, the face 64 and the further face 66 can be in contact with the lower surfaces 24, or the lower surfaces 24 can be positioned at a very short distance from the face 64 and from the further face 66, so that the plastics cannot flow between the lower surfaces 24, the face 64 and the further face 66.

In this position, the conical surface 67 of the annular element 65 engages in a shapingly coupled manner with the first coupling surface 28 of each movable part 20. The plastics contained inside the die cavity 55, which plastics is pressed by the punch 14, start to rise to the movable parts 20, whilst remaining below the interaction plane P. Nevertheless, even if the plastics flowed to a higher level of the interaction plane P already during this step, the plastics could not penetrate the gap defined between the face 64 and the movable parts 20 because the latter are maintained firmly pressed against the die arrangement 13 by the pressurised fluid contained in the lower chamber 36.

After reaching the position shown in FIG. 7, the actuator moves upwards not only the die arrangement 13, but also the movable parts 20 and the retaining sleeve 31 therewith, which move integrally with the annular element 65. In this step, the movable element 41 is still stationary whilst the guiding surface 27 of the movable parts 20 slides along the external guiding surface 44 of the movable element 41. The pressurised fluid contained in the lower chamber 36 is thus compressed, which pressurised fluid acts as a gas spring opposing the retaining sleeve 31 whilst the latter rises inside the housing element 35.

Figure 8:
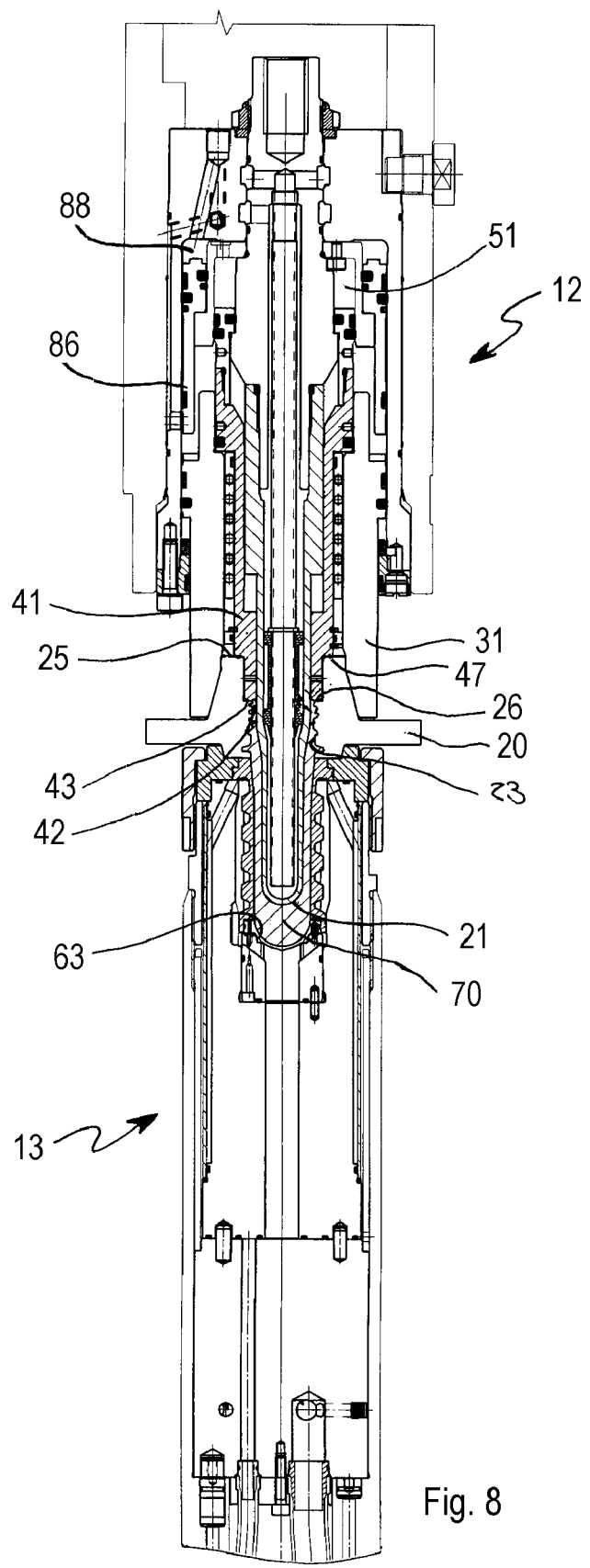
FIG. 8 is a view like the one in FIG. 2, showing the moulding unit in a closed position.

In the position in FIG. 8, the upper surfaces 25 of the movable parts 20, which are pushed by the actuator, go to abut against the interacting surface 47 of the movable element 41. Simultaneously, the transverse surfaces 26 of the movable parts 20 are positioned in contact with the further transverse surface 43 of the movable element 41, or at a distance from the further transverse surface 43 that is sufficiently short for the plastics not to be able to flow between the transverse surfaces 26 and the further transverse surface 43. Thus a forming chamber 70 is defined between the punch arrangement 12 and the die arrangement 13, in which forming chamber 70 the preform 1 can be formed. In particular, the forming chamber 70 is bounded by the internal forming surface 63 of the die cavity 55, by the complex forming surfaces 23 of the movable parts 20, by the annular forming surface 42 of the movable element 41 and by the external forming surface 21 of the punch 14. In the position in FIG. 8, the forming chamber 70, whilst being already closed, does not yet have a shape corresponding to the definitive shape of the preform 1, inasmuch as the punch 14 and the die cavity 55 have not yet reached the final relative configuration thereof.

In this position, the further pressurised fluid contained in the intermediate chamber 51 pushes the movable element 41 strongly against the movable parts 20. The plastics are thus prevented from flowing through the gap defined between the transverse surfaces 26 and the further transverse surface 43, even if the plastics, unlike what is shown in FIG. 8, have already reached the movable element 41. In other words, the movable element 41 acts as a closing element that closes above the forming chamber 70 whilst the plastics fill the forming chamber 70 completely.

After reaching the position shown in FIG. 8, the actuator continues to move the die cavity 55 upwards, together with the annular element 65, the movable parts 20, the retaining sleeve 31 and the movable element 41. The further pressurised fluid contained in the intermediate chamber 51, said further pressurised fluid acting as a gas spring that exerts an opposing action on the movable element 41, is thus compressed.

At this point, the retaining sleeve 31, by moving together with the die arrangement 13, pushes upwards the sleeve component 86, which compresses the further pressurised fluid contained in the upper chamber 88. The movable element 41, which in these instants moves together with the retaining sleeve 31, can move upwards only after overcoming also the opposing force that is exerted by the further pressurised fluid contained in the upper chamber 88, said further pressurised fluid acting as a gas spring.

Owing to the opposing action exerted by the further pressurised fluid contained in the intermediate chamber 51 and in the upper chamber 88, it is also possible, if necessary, to reduce the moving speed of the actuator that moves the die arrangement 13 and consequently fill more slowly the regions of the forming chamber 70 intended to form the mouth 4. This can be positive, inasmuch as the mouth 4 is the most critical part of the preform 1 to be filled, both because the mouth 4 has a more complex geometrical shape than other zones of the preform 1 and because the plastics fill the regions of the forming chamber 70 intended to form the mouth 4 when the plastics have partially cooled and the viscosity thereof has decreased.

It should be noted that reducing the speed of the actuator, within a certain limit, through the opposing action that is performed by the movable element 41 on which the further pressurised fluid acts, does not involve the constructional complications that would be necessary if the same effect should be obtained by a speed adjusting system that was inside the actuator.

Figure 9:
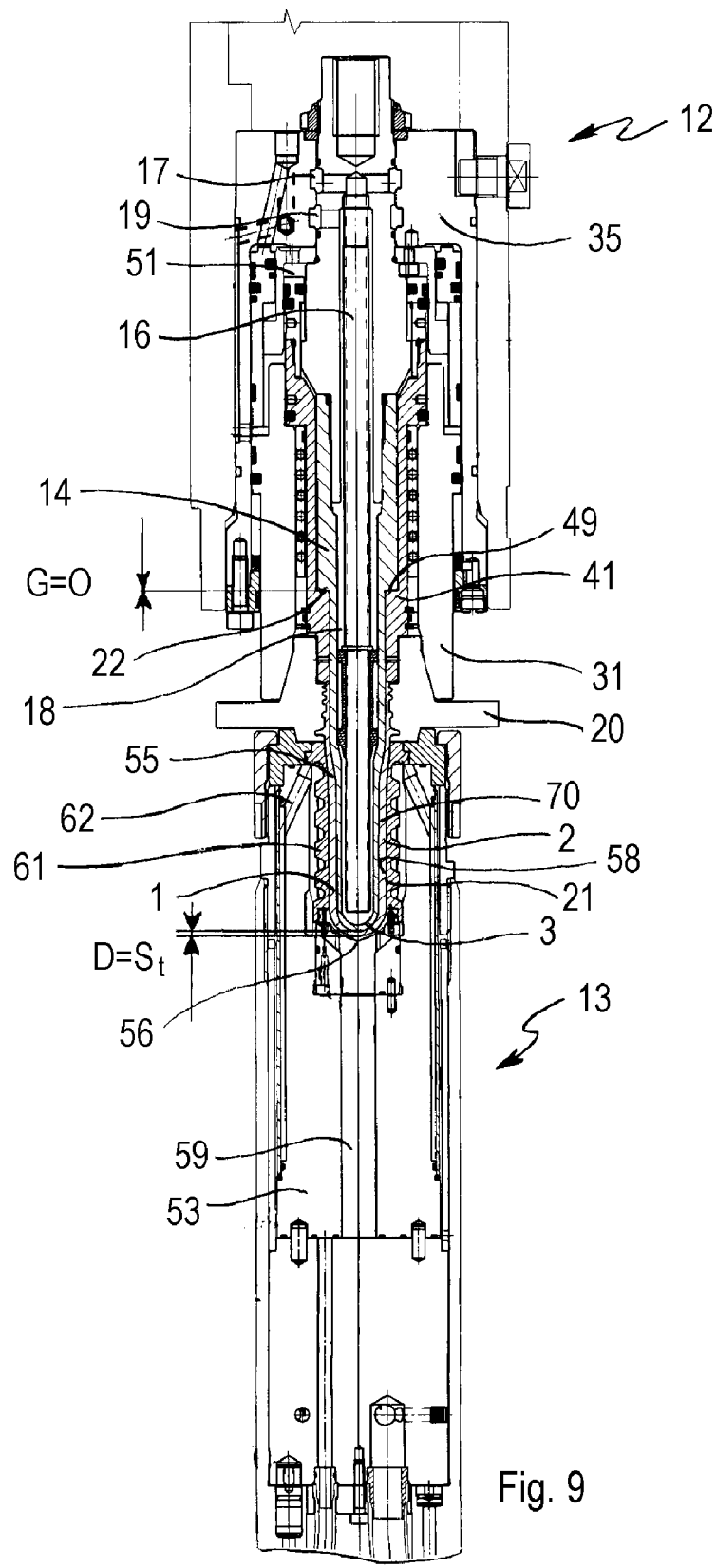
FIG. 9 is a view like the one in FIG. 2, showing the moulding unit in a forming position.

The volume of the forming chamber 70 is progressively reduced as the punch 14 sinks inside the die cavity 55, until the punch 14 reaches the forming position shown in FIG. 9, in which the forming chamber 70 has a geometry substantially corresponding to that of the preform 1.

FIG. 9 refers to forming a dose 68 having a mass that is equal to a preset minimum value. In this case, the further shoulder 49 obtained inside the movable element 41 abuts on the shoulder 22 of the punch 14. In other words, the clearance G between the shoulder 22 and the further shoulder 49 tends to reach a zero value, also considering that the density of the plastics varies continuously with the varying of the pressure and the temperature of the plastics. In these conditions, the lower end of the punch 14 is positioned at a distance D from the bottom wall 56, the distance D being equal to a theoretical value $S_t$ of the thickness of the transverse wall 3 of the preform 1. The theoretical thickness $S_t$ can, for example, be the same as 2 mm.

The moulding unit 11 remains in the forming position shown in FIG. 9 for a sufficiently long interval for the preform 1 to stabilise and be cooled to a temperature at which it is possible to handle the preform 1 without damaging it. In the initial instants of this interval, the plastics contained in the forming chamber 70 elastically deform the side wall 58 and the bottom wall 56. Subsequently, the volume of the plastics decreases through the cooling effect and also the volume of the forming chamber 70 decreases simultaneously because the side wall 58 and the bottom wall 56 recover the original shape thereof as they are no longer pushed by the plastics.

Figure 10:
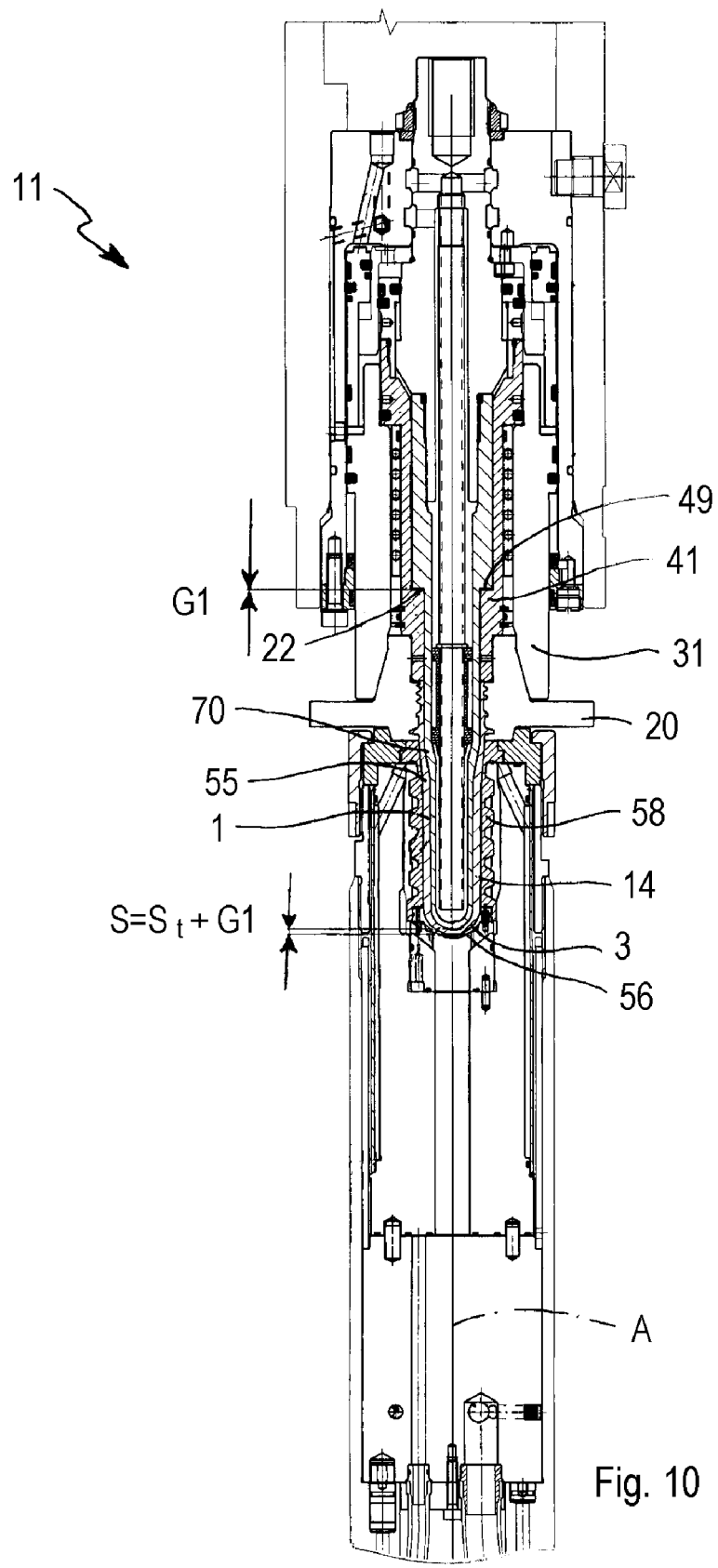
FIG. 10 is a view like the one in FIG. 9, that refers to the forming of a preform starting from a dose having a greater volume than the dose to which FIG. 9 refers.

If the dose 68 has a mass that is greater than the preset minimum value, despite being processable by the moulding unit 11, a situation occurs of the type shown in FIG. 10. The die cavity 55, the movable parts 20, the retaining sleeve 31 and the movable element 41 move together upwards pushed by the actuator. Nevertheless, due to the pressure exerted by the plastics inside the forming chamber 70, the further shoulder 49 of the movable element 41 does not go to abut against the shoulder 22 of the punch 14. In other words, between the shoulder 22 and the further shoulder 49 a clearance G1 is defined that is greater than zero, for example equal to 0.2 mm. In this way a preform 1 is obtained having a total longitudinal dimension that is not different from that obtained in the case shown in FIG. 9, said total longitudinal dimension being measured parallel to the moulding axis A. Nevertheless, the thickness S of the transverse wall 3 of the preform 1 is greater than the theoretical value $S_t$, and more in particular it is approximately equal to the theoretical value $S_t$ increased by the clearance G1. In the example being discussed, the thickness S can be equal to 2.2 mm.

Naturally, even in the case shown in FIG. 10 the plastics intended for constituting the preform 1 deform elastically the side wall 58 and the bottom wall 56 of the die cavity 55, the side wall 58 and the bottom wall 56 of the die cavity 55 regaining the initial shape thereof when the plastics shrink by cooling.

The preform 1 inside the moulding unit 11 is cooled as will be explained below with reference to FIG. 9.

A cooling fluid, for example water, enters the inlet conduit 16 through the inlet zone 17 and moves to the lower end of the punch 14, so as to cool the portion of external forming surface 21 that shapes the transverse wall 3 of the preform 1. Subsequently, the cooling fluid rises inside the punch 14 through the outlet conduit 18, cooling the further portion of external forming surface 21 that shapes the hollow body 2 of the preform 1. Having internally cooled the preform 1, the cooling fluid can now leave the punch 14 through the outlet zone 19.

Simultaneously, a further cooling fluid, for example water, reduces the temperature of the die cavity 55 entering the stem 53 through the cooling conduit 59. From here the further cooling fluid first laps the bottom wall 56 and subsequently the side wall 58 and, owing to the effective heat exchange that occurs with the cooling fins 61, cools the preform 1 externally. The further cooling fluid moves away from the die cavity 55 through the return conduits 62.

The mouth 4 of the preform 1 is cooled by a cooling circuit, which is not shown, included in the movable parts 20.

It should be noted that, before reaching the forming position shown in FIG. 9, possible residual quantities of air inside the forming chamber 70 can be evacuated both through a first interface zone 76 between the movable element 41 and the punch 14 and through a second interface zone 77 between the movable element 41 and the movable parts 20, as shown in FIG. 15. Two paths are thus made available through which the air can be effectively removed from the forming chamber 70.

Figure 11:
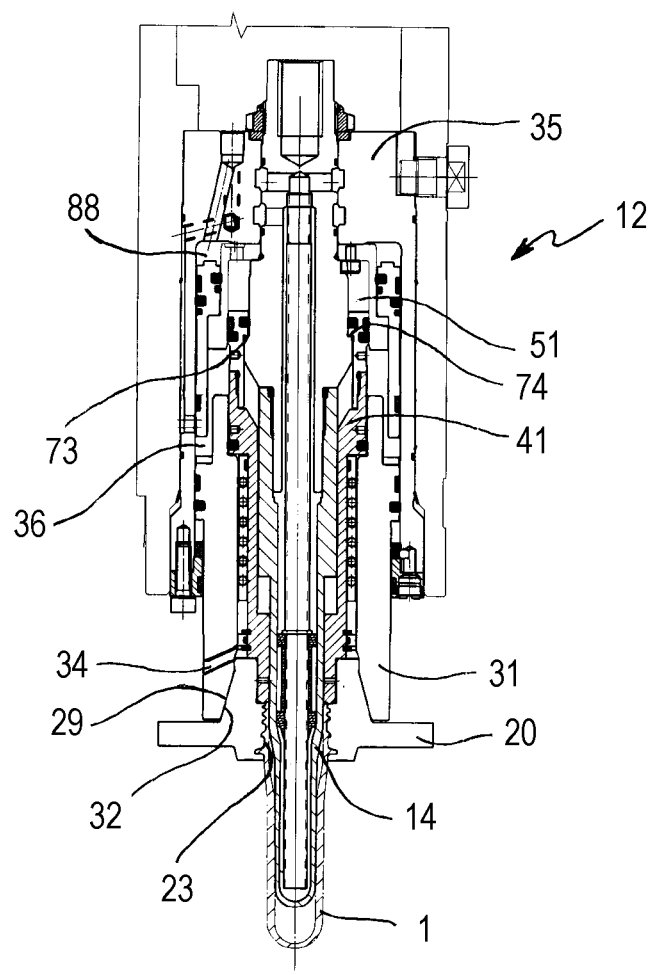
FIG. 11 is a view like the one in FIG. 2, showing the moulding unit in a first extracting position in which the preform starts to be detached from the punch.
Figure 11:
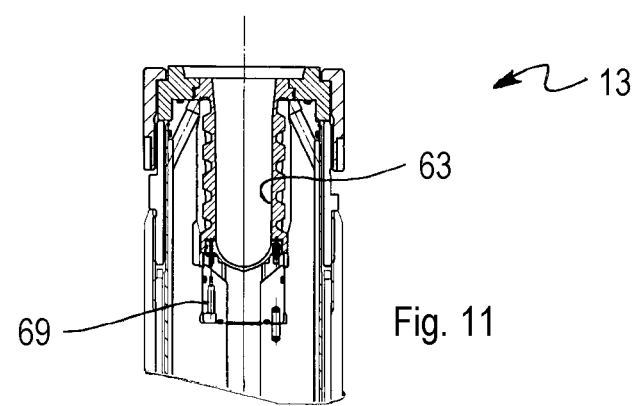

When the preform 1 has been stabilised and cooled to a temperature at which the preform 1 can be handled without substantial risk of damage, the moulding unit 11 is opened to enable the preform 1 that has just been formed to be removed. As shown in FIG. 11, a pressurised gas, for example compressed air, can be sent into the die cavity 55 through the passage 69 so that the preform 1 becomes detached more easily from the internal forming surface 63.

Similarly, it is possible to send a further pressurised gas, for example compressed air, through the hole 34 so as to enable the preform 1 to become detached easily from the movable element 41, from the movable parts 20 and from the punch 14. As shown in FIG. 15, a plurality of grooves 71 is obtained on the interacting surface 47 of the movable element 41, whilst a plurality of channels 72 is obtained on the external guiding surface 44. When the movable element 41 is in contact with the movable parts 20, the compressed air coming from the hole 34 flows through the grooves 71 and reaches the channels 72. From here, a part of the compressed air moves to the punch 14 through the through holes 48, in order to detach the preform 1 from the external forming surface 21. On the other hand, another part of the compressed air traverses the entire channels 72 so as to arrive near the annular forming surface 42 and the complex forming surface 23.

The grooves 71 and the channels 72 do not only enable compressed air to be sent into the forming chamber 70, but also enable possible quantities of air to be removed that were initially present in the forming chamber 70, as already disclosed previously. Both the grooves 71 and the channels 72 have a limited depth of the order of a few tenths of a millimetre and such as to eliminate possible quantities of residual air present in the forming chamber 70 without causing overheating of the plastics. Whilst compressed air is sent to the forming chamber 70, the actuator moves downwards the stem 53 bearing the die cavity 55, moving the die cavity 55 away from the punch arrangement 12, as shown in FIG. 11. The further pressurised fluid contained in the upper chamber 88 and in the intermediate chamber 51 pushes the movable element 41 to the die arrangement 13, causing the movable element 41 to descend inside the housing element 35 until the protrusion 73 goes to abut against the shoulder zone 74 of the component 83. At this point, the movable element 41 stops. The retaining sleeve 31, on which also the pressurised fluid acts that is contained in the lower chamber 36, has moved integrally with the movable element 41, dragging therewith the movable parts 20. The latter are still in the contact position inasmuch as the second coupling surfaces 29 engage the retaining surface 32.

During this step, the preform 1 is associated with the movable parts 20 because the threaded portion 5, the circular ridge 6 and the ring 7 are grasped by the complex forming surface 23. Moving to the die arrangement 13, the movable parts 20 thus detach the preform 1 from the punch 14. Further, detaching the preform 1 from the punch 14 is made easier by the movable element 41 the annular forming surface 42 of which presses on the edge zone 10 of the preform 1. The movable element 41, which is pushed by the further pressurised fluid contained in the upper chamber 88 and in the intermediate chamber 51, thus acts as an extracting element that removes the preform 1 from the punch 14 and prevents deformation of the edge zone 10, especially in the first instants in which the preform 1 starts to becoming detached from the punch 14. In these instants, the force, which has to be applied to the preform 1 to remove the preform 1 from the punch 14, is maximum.

Figure 12:
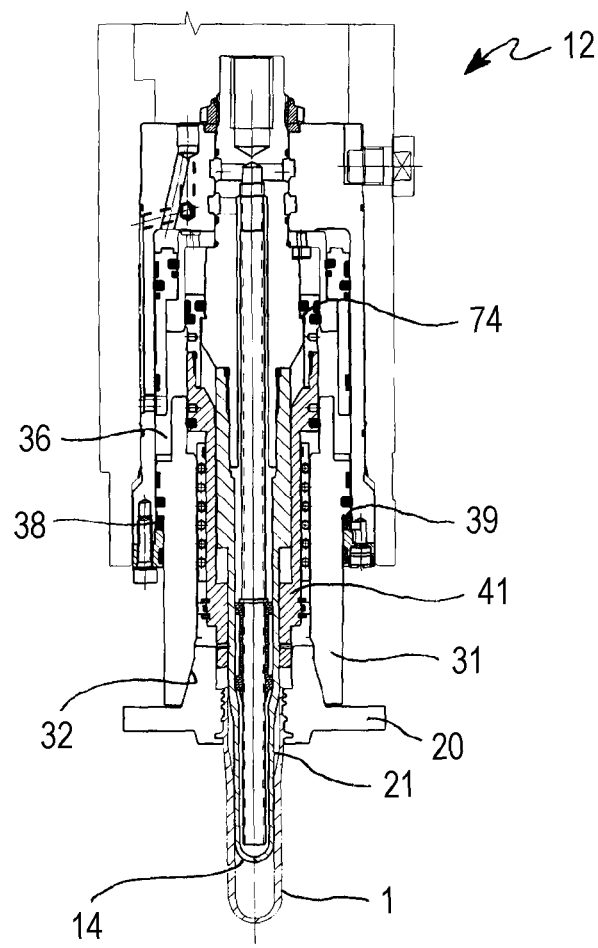
FIG. 12 is a view like the one in FIG. 2, showing the moulding unit in a second extracting position subsequent to that of FIG. 11.
Figure 12:
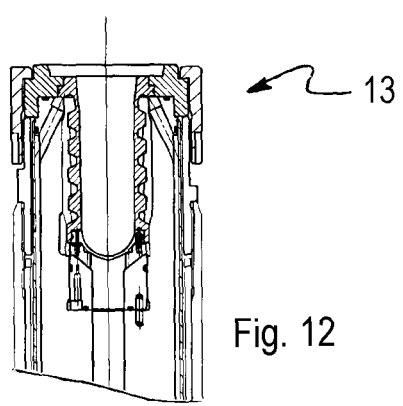

The pressurised fluid contained in the lower chamber 36 further pushes the retaining sleeve 31 to the die arrangement 13. As shown in FIG. 12, the retaining sleeve 31 thus moves away from the movable element 41, which is maintained stationary by the shoulder zone 74. The movable parts 20, which are maintained in mutual contact by the retaining surface 32, move together with the retaining sleeve 31 and continue to remove the preform 1 from the punch 14. It should be noted that during this step the preform 1, which has already been detached from the external forming surface 21, can be moved away from the punch 14 with a relatively low extracting force, which is performable only by the pressurised fluid contained in the lower chamber 36.

As visible in FIG. 12, the retaining sleeve 31 stops when the front surface 39 thereof goes to abut against the stop 38.

Figure 13:
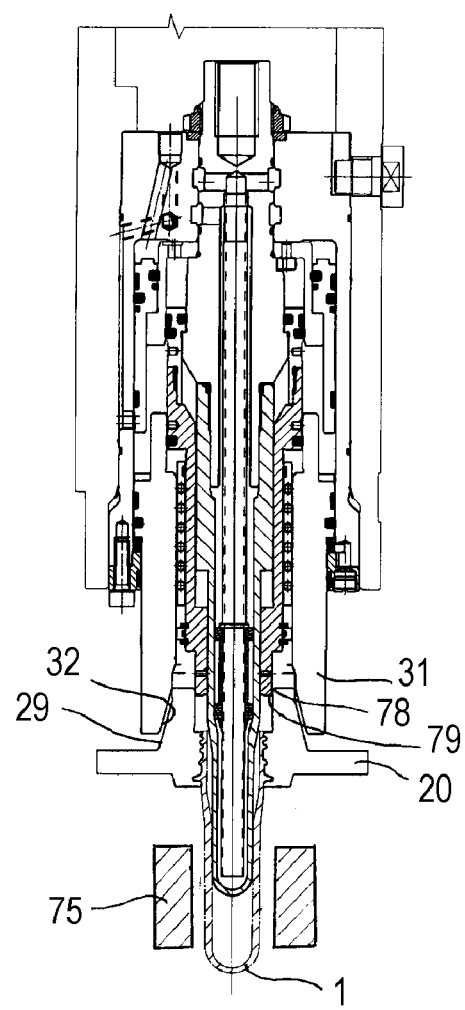
FIG. 13 is a view like the one in FIG. 2, showing the moulding unit in a third extracting position subsequent to that of FIG. 12.
Figure 13:
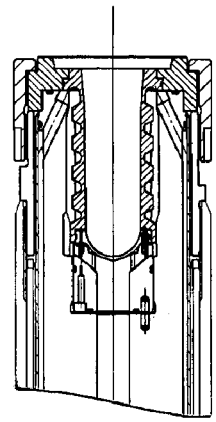

Subsequently, as shown in FIG. 13, driving means that is not shown, comprising for example a cam or a linear actuating device, moves the movable parts 20 away from the retaining sleeve 31, disengaging the second coupling surfaces 29 from the retaining surface 32. A gripping device 75 approaches the preform 1 to grasp the preform 1 as soon as the latter is freed from the movable parts 20.

Figure 14:
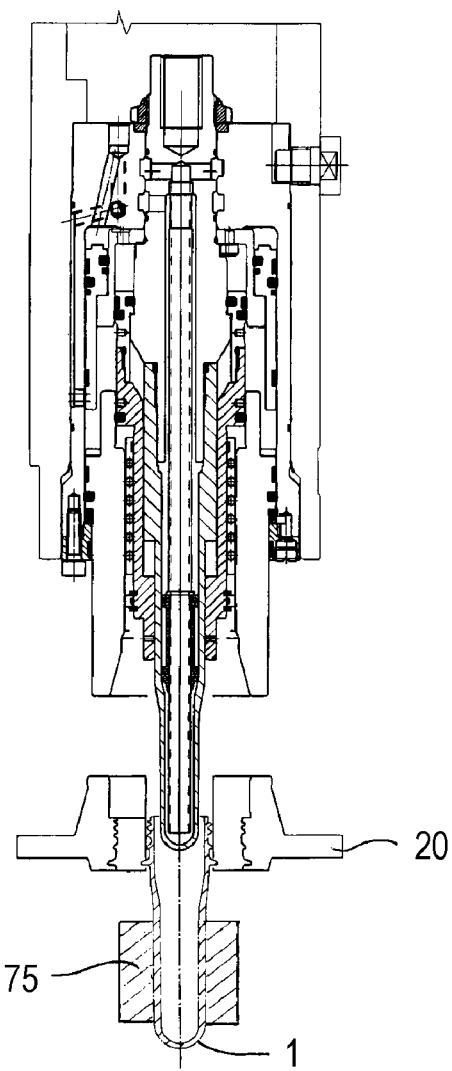
FIG. 14 is a view like the one in FIG. 2, showing the moulding unit in a final extracting position.
Figure 14:
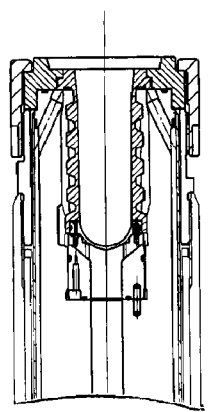

As shown in FIG. 14, the movable parts 20 are then moved away from one another, through devices that are not shown, and release the preform 1, which is collected by the gripping device 75 and conveyed to the outlet of the apparatus.

The sequence of operations disclosed above can now be repeated to mould a new preform.

For this purpose, the driving device again positions the movable parts 20 in the contact position and moves the movable parts 20 to the retaining sleeve 31. Whilst the movable parts 20 penetrate inside the retaining sleeve 31, the external guiding surface 44 of the movable parts 20 is guided by the internal guiding surface 45 of the retaining sleeve 31. Possible anomalous contacts between the movable parts 20 and the retaining sleeve 31, due for example to small misalignments or mounting or dimensional errors, occur between an external corner 78 of the movable element 41, shown in FIG. 13, and an internal corner 79 of each movable part 20 and subsequently between the external guiding surface 44 and the internal guiding surface 45. These anomalous contacts, even if they are produced at high relative speeds of the movable element 41 and of the movable parts 20, occur between parts of the moulding unit 11 that do not form defects on the preform 1, inasmuch as both the external corner 78 and the internal corner 79 are outside the forming chamber 70.

Figure 16:
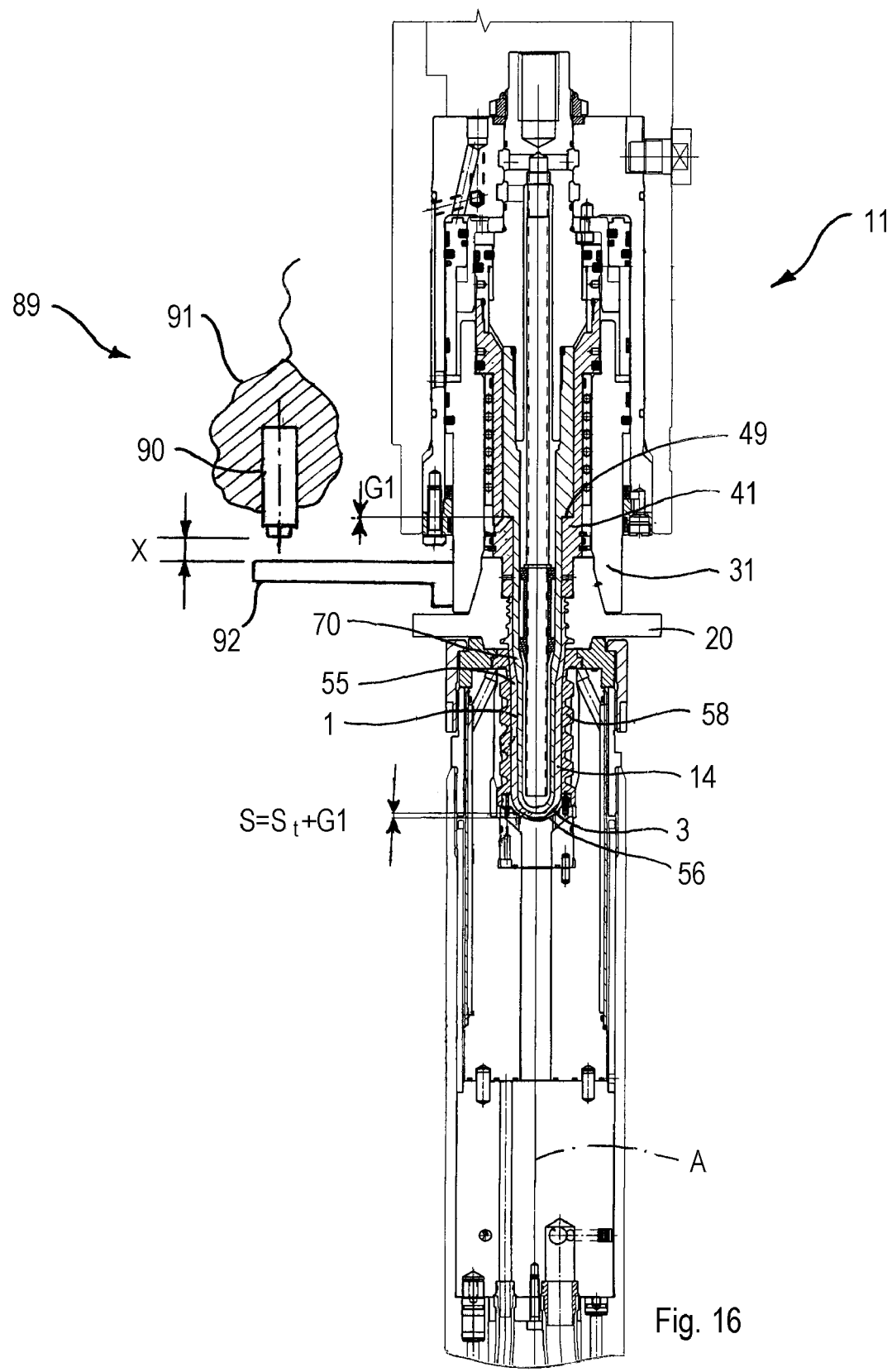
FIG. 16 is a view like the one in FIG. 10, showing a moulding unit according to an alternative embodiment, provided with a sensing device.

FIG. 16 shows an alternative embodiment, which differs from the embodiment of FIGS. 2 to 15 because each moulding unit 11 is provided with a sensing device 89 for conducting quality control on the preforms 1. The sensing device 89 comprises a sensor 90, for example of inductive type, which is mounted on 5 a support 91 next to the punch arrangement 12. The support 91 is fixed with respect to the carousel on which the moulding units 11 are mounted.

The sensing device 89 further comprises a reference bracket 92 fixed to a part of the moulding unit 11 that is movable along the moulding axis A. In the example shown in FIG. 16, the reference bracket 92 has an "L"-shaped cross section and is fixed to the retaining sleeve 31. The reference bracket 92 faces the sensor 90 so that the latter can detect the distance X that separates the sensor 90 from the reference bracket 92 in a preset position of the moulding unit 11, for example in the forming position. The distance X is linked to the mass of the processed dose because, as explained previously with reference to FIG. 10, if the dose has a mass that is greater than the theoretical mass, a clearance G1 that is greater than zero is defined between the movable element 41 and the punch 14. Consequently, if the dose has a greater mass than the theoretical mass, the retaining sleeve 31, which moves together with the movable element 41 near the forming position, stops at a lower position than would occur if the mass of the dose were equal to the theoretical value. The distance X detected by the sensor 91 is therefore greater than that detected for doses with a mass equal to the theoretical value. The clearance G1 and the distance X are greater the greater is the mass of the processed dose.

From the above, it is clear that by measuring the distance X in the forming position it is possible to have information on the mass of the processed dose in the moulding unit 11. In particular, if the value of the measured distance X is within a preset interval it can be deduced that the mass of the dose enables a good quality preform to be obtained. If on the other hand a distance X is measured outside the preset interval, then an acceptable preform cannot be obtained from the corresponding dose. In the latter case, two situations may occur. If the mass of the dose is slightly different from the theoretical value, then it is not necessary to stop the apparatus, but the corresponding preform can be equally moulded and subsequently rejected. By so doing, owing to the sensing device 89, it is possible to reject in a very simple manner preforms obtained from doses that are only slightly greater than the theoretical ones, which have flashes that are not easily visible, that are otherwise definable only with complex vision systems.

If on the other hand the mass of the plastics introduced into the die cavity 55 is very different from the theoretical value, for example because two doses have been deposited in the die cavity 55 erroneously, then the apparatus is stopped immediately to prevent greater drawbacks from occurring.

If repeated errors in the mass of the dose are detected, the measurements made by the sensor 90 can be used as a feedback to control the system that supplies the plastics and transfers the doses to the moulding units 11. For example, if doses having a mass greater than the theoretical value are introduced repeatedly into all the moulding units 11, it is possible to intervene on the extruding device that extrudes the plastics from which the doses are separated.

The sensing device 89 can also be used to check if a dose of acceptable or anomalous mass has been introduced correctly into the die cavity 55. For example, the dose may partially exit the die cavity 55 due to drawbacks that occurred when the dose was deposited in the die arrangement 13. In this case, the sensing device 89 detects that, before reaching the forming position, the retaining sleeve 31 is moving at an excessive speed, as the die cavity 55 is partially empty, and plastics are not shaped in the die cavity 55 in a portion of the stroke of the actuator that moves the die arrangement 13.

If a situation of this type is detected, it is possible to stop the apparatus to prevent technical drawbacks from occurring due to the plastics that exited the mould.

The sensing device 89 can also be associated with parts of the moulding unit 11, said parts being movable along the moulding axis A, which are different from the retaining sleeve 31. For example, the reference bracket 92 could be fixed directly to the actuator that moves the die arrangement 13.

Figure 17:
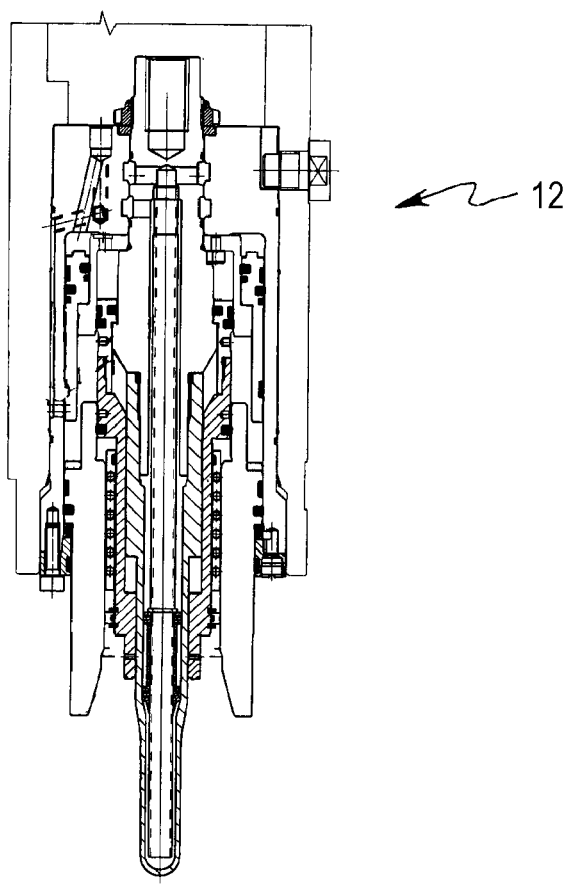
FIG. 17 is a view like the one in FIG. 2, showing a moulding unit according to another alternative embodiment, in the open position.
Figure 17:
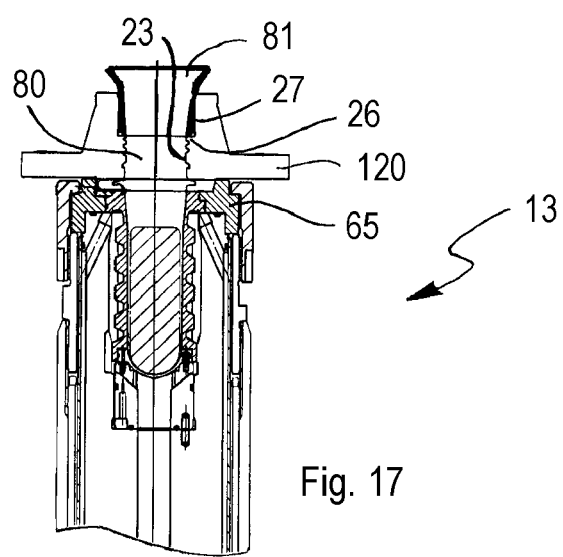

FIG. 17 shows another alternative embodiment, in which the parts common to the embodiment shown in FIGS. 2 to 15 are indicated by the same reference numbers as those used previously and are not disclosed again. In the embodiment in FIG. 17, at least two movable parts 120 are provided that are included in the die arrangement 13 rather than in the punch arrangement 12 as disclosed previously. In the open position, the movable parts 120 are positioned in contact to one another and are rested on the annular element 65, so as to add to the die cavity 55 a further volume 80, which is bounded by the complex forming surface 23.

This arrangement is particularly suitable for handling doses having a significant mass with respect to the mass that could be housed in the sole die cavity 55 bounded by the internal forming surface 63. These doses, if the movable parts are included in the punch arrangement 12, could cause drawbacks by exiting the die cavity 55 prematurely when the punch 14 starts to crush the plastics.

If, on the other hand, as shown in FIG. 17, the movable parts 120 are immediately above the die cavity 55, the dose 68, crushed by the punch 14, can exit the cavity 55 without creating drawbacks, inasmuch as the dose 68 remains contained in the further volume 80.

It should be noted that, in order to facilitate the dose 68 to enter the cavity 55, an introducing device, having for example the shape of a funnel 81, can be temporarily positioned between the movable parts 20 and act as a slide for the dose 68. The funnel 81 can be centred on the guiding surface 27 so as to be positioned precisely with respect to the movable parts 120 and prevent the dose 68 from knocking against the transverse surface 26.

Figure 18:
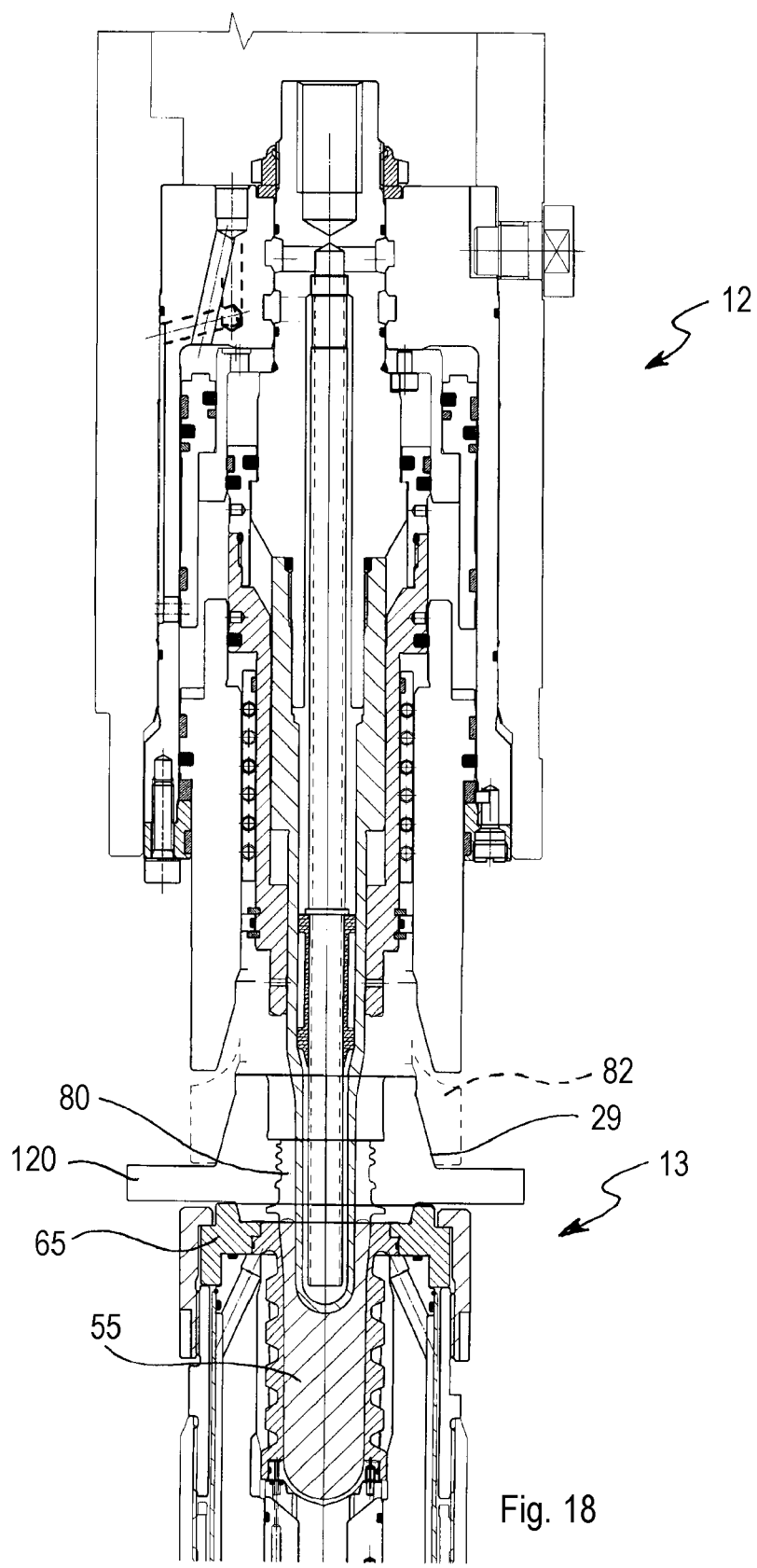
FIG. 18 is a view like the one in FIG. 17, showing, on an enlarged scale, the moulding unit in FIG. 17 in a position near the closed position.

When the dose 68 has entered the die cavity 55, the funnel 81 is moved away from the moulding unit 11 and the actuator moves the die arrangement 13 to the punch arrangement 12, as shown in FIG. 17. A pressing element 82, shown with a broken line in FIG. 18, engages the second coupling surface 29 of each movable part 120 in order to maintain the movable parts 120 in contact with one another and push the movable parts 120 against the annular element 65. In this way it is prevented that the plastics, rising from the die cavity 55 to the further volume 80, can penetrate between the annular element 65 and the movable parts 120.

Lastly, it should be noted that having provided the movable element 41 in the punch arrangement 12 enables a particularly simple structure of the die arrangement 13 to be used, which is substantially devoid of mutually moving parts.

The invention claimed is:

1. Apparatus comprising a punch arrangement and a die arrangement having a cavity, said punch arrangement and said die arrangement being opposite one another for compression moulding a preform from a dose of plastics, a punch being included in said punch arrangement, said apparatus further comprising two mutually movable parts each having a forming surface for forming undercuts on a neck portion of said preform, wherein said punch arrangement further comprises an annular forming element distinct from said mutually movable parts, and from said punch, said annular forming element having an annular forming surface for being contacted by the plastics and thereby forming an annular edge zone of said preform, said apparatus further comprising a retaining sleeve distinct from said annular forming element, said retaining sleeve having a conical internal retaining surface for engaging with a coupling surface of the movable parts in order to keep the movable parts in contact with one another in a contact position thereof, said punch arrangement and said die arrangement being mutually movable to define a closed forming chamber delimited by said die arrangement, said punch, said mutually movable parts and said annular forming element, wherein said annular forming element and said punch are movable relative to one another after the forming chamber has been closed in order to progressively reduce volume of said forming chamber until said preform is obtained, and wherein each movable part has a guiding surface which is slidable in contact with an external guiding surface of said annular forming element when the movable parts are in the contact position and move relative to the annular forming element in order to close or open the forming chamber.

2. Apparatus according to claim 1, wherein said annular forming element surrounds said punch.

3. Apparatus according to claim 1, wherein said annular forming element is coaxial to said punch.

4. Apparatus according to claim 1, wherein said annular forming element has a tubular shape open at its ends.

5. Apparatus according to claim 1, wherein said punch comprises a region bounded by a forming surface suitable for forming an internal surface of said preform, said region protruding from said annular forming element towards said die arrangement.

6. Apparatus according to claim 1, wherein said punch comprises a shoulder on which a further shoulder of said annular forming element abuts in an end-stroke position of said annular forming element.

7. Apparatus according to claim 1, wherein said annular forming element is movable with respect to said punch owing to a force exerted by said die arrangement.

8. Apparatus according to claim 1, and further comprising a first elastic device acting on said annular forming element for pushing said annular forming element towards said die arrangement.

9. Apparatus according to claim 8, wherein said first elastic device comprises a first chamber in which a first pressurised fluid is contained, said first pressurised fluid acting as a gas spring.

10. Apparatus according to claim 8, and further comprising a second elastic device acting on said annular forming element through an interposed component, so as to push said annular forming element towards said die arrangement.

11. Apparatus according to claim 10, wherein said first elastic device comprises a first chamber in which a first pressurised fluid is contained, said first pressurised fluid acting as a gas spring, said second elastic device comprising a second chamber containing a second pressurised fluid, said second pressurised fluid acting as a gas spring.

12. Apparatus according to claim 11, wherein said second chamber communicates with said first chamber.

13. Apparatus according to claim 11, and further comprising a third elastic device acting on the retaining sleeve suitable for maintaining said movable parts in contact with one another, so as to push said retaining sleeve towards said die arrangement.

14. Apparatus according to claim 13, wherein said third elastic device comprises a third chamber containing a third fluid, said third fluid being at a lower pressure than said first pressurised fluid, said third fluid acting as a gas spring.

15. Apparatus according to claim 1, and comprising a sensing device for detecting position of an actuating device suitable for moving said die arrangement with respect to said punch.

16. Apparatus according to claim 15, and comprising a retaining sleeve suitable for maintaining said movable parts in contact with one another, said sensing device being arranged so as to detect position of said retaining sleeve, said retaining sleeve being movable by said actuating device at least for a portion of the stroke thereof.

17. Apparatus according to claim 16, wherein said sensing device comprises an inductive sensor suitable for detecting the position of a reference element fixed to said retaining sleeve.

18. Apparatus according to claim 1, wherein said annular forming element is interposed between said punch and said movable parts.

19. Apparatus according to claim 18, wherein a first interface zone is defined between said annular forming element and said movable parts and a second interface zone is defined between said annular forming element and said punch, said first interface zone and said second interface zone being arranged for evacuating air from said forming chamber.

20. Apparatus according to claim 19, wherein said first interface zone and said second interface zone communicate with a source of pressurised gas, to detach said preform from said punch.

21. Apparatus according to claim 1, wherein said movable parts are supported by said punch arrangement.

22. Apparatus according to claim 1, wherein said movable parts are supported by said die arrangement.

23. Apparatus according to claim 1, wherein said die arrangement comprises a die provided with said cavity in which an external portion of said preform can be shaped.

24. Apparatus according to claim 23, wherein said movable parts are supported by said die arrangement, said apparatus further comprising a pressing element for maintaining said movable parts in contact with said die when said punch arrangement is distanced from said die arrangement.

25. Apparatus according to claim 1, wherein said punch arrangement and said die arrangement are included in a moulding unit, said apparatus comprising a plurality of moulding units arranged in a peripheral region of a rotatable carousel.

26. Apparatus according to claim 1, wherein said punch is arranged in a fixed position.

27. Apparatus according to claim 1, and further comprising an actuator for moving said die arrangement towards said punch arrangement along a stroke in order to close the forming chamber.

28. Apparatus according to claim 27, wherein the punch arrangement comprises a chamber containing a pressurized fluid acting on the retaining sleeve, the die arrangement having a surface for contacting a further coupling surface of the movable parts at a point of said stroke, so that the die arrangement displaces the movable parts against action of said pressurized fluid.

29. Apparatus according to claim 28, wherein the punch arrangement comprises a further chamber containing a further pressurized fluid acting on the annular forming element, the movable parts having a further surface for abutting on an interacting surface of the annular forming element at a subsequent point of said stroke, so that the movable parts displace the annular forming element against action of said further pressurized fluid.

* * * * *